United States Patent
Aretz

(10) Patent No.: US 7,454,793 B2
(45) Date of Patent: Nov. 18, 2008

(54) METHOD FOR CONTROLLING THE OPENING AND TRANSMISSION OF ELECTRONIC DATA ON ELECTRONIC COMMUNICATION DEVICES

(75) Inventor: Kurt Aretz, Isselburg (DE)

(73) Assignee: Siemens Aktiengesellschaft, Munich (DE)

( * ) Notice: Subject to any disclaimer, the term of this patent is extended or adjusted under 35 U.S.C. 154(b) by 1085 days.

(21) Appl. No.: 10/476,277

(22) PCT Filed: Apr. 22, 2002

(86) PCT No.: PCT/DE02/01472

§ 371 (c)(1),
(2), (4) Date: Oct. 27, 2003

(87) PCT Pub. No.: WO02/089439

PCT Pub. Date: Nov. 7, 2002

(65) Prior Publication Data

US 2004/0177268 A1 Sep. 9, 2004

(30) Foreign Application Priority Data

Apr. 27, 2001 (DE) ................. 101 20 698

(51) Int. Cl.
*H04L 9/32* (2006.01)

(52) U.S. Cl. .......................................... 726/26; 726/27
(58) Field of Classification Search ................. 726/2–3, 726/26–31; 713/193–194
See application file for complete search history.

(56) References Cited

U.S. PATENT DOCUMENTS 6,874,037 B1 * 3/2005 Abram et al. ............... 709/248
7,212,098 B1 * 5/2007 Trent et al. ................... 340/5.3

FOREIGN PATENT DOCUMENTS

| | | |
|---|---|---|
| DE | 197 17 149 | 10/1998 |
| EP | 0 715 247 | 6/1996 |
| WO | WO 00/60508 | 10/2000 |
| WO | WO 02/082244 | 10/2002 |

* cited by examiner

Primary Examiner—Hosuk Song

(57) ABSTRACT

A method is provided for controlling the opening of the representation of electronic data on mobile electronic communication devices, whereby the access to data occurs depending on opening characters which can arise interactively on the same or different mobile communication terminals. Data access thus can be modeled according to a set of rules, corresponding to the usual handling of physical, concrete collectable and exchangeable objects or to the behavior of the natural population.

14 Claims, 1 Drawing Sheet

METHOD FOR CONTROLLING THE OPENING AND TRANSMISSION OF ELECTRONIC DATA ON ELECTRONIC COMMUNICATION DEVICES

BACKGROUND OF THE INVENTION

The present invention relates to a method for opening and transmission of electronic data on electronic communication devices, especially mobile communication terminals. Conventional methods for control of the opening of the presentation of electronic data on electronic communication devices consist of the presentation of electronic data on these types of devices being initiated by a user input.

Electronic communication devices are understood as stationary devices, such as PCs and mobile devices, with mobile electronic communication devices being identified in this context as all electronic devices which are portable in the widest sense and are equipped with facilities for data transmission (mobile telephones, palmtops, or similar). Electronic data can be presented visually and/or audibly. To this end, the electronic communication devices include presentation facilities, if necessary in the form of add-on units. Electronic data to be presented is available in the form of data records. As well as its "content," a data record contains a record identifier to identify it.

Access to a data record (i.e., the opening of the presentation of the data record on a user instruction), can also depend on an opening code (cf. Table 1). Access is either granted or refused to a data record D1 on a device G1 depending on an opening code.

If electronic data is transmitted, such as in form of visiting cards, e-mail or file transfer, the data is copied from a send device to a receive device.

Transferred data basically can be presented at regular intervals on the sender's as well as the recipient's device. No precautions are taken for the fact that access to a data record on one device may restrict or influence access to a data record on another device and cuts it down in this way. In particular, for the access to transferred data originating from the receiver side, there is no way of influencing which access to the transferred data remains on the send side after the transmission.

The consequence of the almost inherent production of copies during data transmission and the data duplication which follows from this is that digital data is not cut back and can develop into interesting and high-value group objects which can be exchanged between private individuals and similar interests ("collectors") and also could be the object of commercial exchanges. In particular, therefore, there is no support for processes in the exchange of electronic data which correspond to dealing with physically concrete collective or exchange objects and can be subject to certain rules.

An object of the present invention is, therefore, to overcome the disadvantages mentioned and provide a method for control of the opening of the presentation of electronic data on electronic communication devices, especially mobile electronic communication terminals.

SUMMARY OF THE INVENTION

In a method according to the present invention, for control of the opening of the presentation of electronic data on electronic communication devices, the electronic data is present in the form of data records identified by a record identifier in each case and the presentation of an electronic data record on an electronic communication device is opened depending on an opening code, with a change of a first opening code relating to the presentation of a first electronic record being dependent on a second opening code relating to the presentation of a second electronic record.

The method in accordance with the present invention is preferably used in mobile communication devices.

In an advantageous embodiment, the presentation of the electronic data is opened on electronic communication devices by modeling based on the opening code according to a set of rules which corresponds to the normal way of handling physically concrete group or exchange objects or to the behavior of natural populations.

Additional features and advantages of the present invention are described in, and will be apparent from, the following Detailed Description of the Invention.

DETAILED DESCRIPTION OF THE INVENTION

Figure 1:
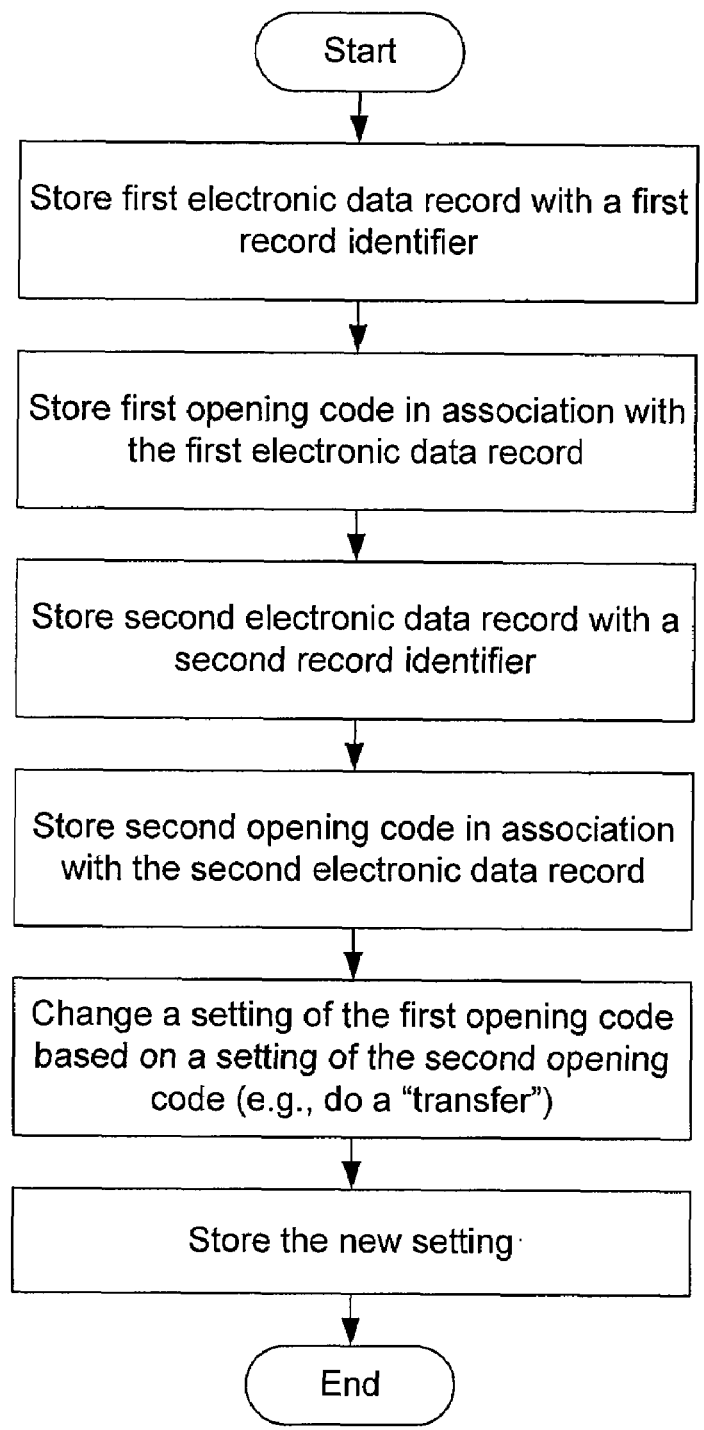
FIG. 1 shows a flow chart of an embodiment of a method for opening and transmission of electronic data on electronic communication devices.

Table 1 shows the modeling of an access to a data record D1. If the opening code is set (Yes), device G1 has access to data record D1. If, on the other hand, the opening code is not set (No), access by device G1 to data record D1 is refused.

Table 2 shows how, for example the transfer of a data record D1 from a device G1 to a device G2 can be modeled Before the transfer, there is access to D1 at G1 but not at G2. After the transfer the situation is reversed. The change of the opening code on G2 and G1 occurs conversely.

Table 3 shows how, by combining two transfer processes, an exchange between a data record D1 on device G1 and a data record D2 on a device G2 can be modeled. Before the exchange, there is access at G1 to D1, but not to D2. At G2 there is access to D2, but not to D1. After the exchange the situation is reversed. The change of the opening codes on G2 and G1 is in the opposite direction here too.

In another—development, similar to processes with natural—populations, a "mutation" of a data record D1 into a data record D2 on the same device can be modeled by changing the opening code of D1 from "Yes" before to "No" afterwards and changing the opening code of D2 in the opposite direction.

In another development, a "propagation" of a data record D1 from a device G1 to a device G2 can be modeled by synchronizing the opening code from D1 to G2 to the opening code from D1 to G1. This can be used to propagate both access and non-access from G1 to G2.

In a further development of this, a "pairing" can be modeled by access to two data records ("parents") opening access to a third data record ("child").

In another development, a "pinning on" of a data record D1 on a device G1 to a data record D2 can be modeled by synchronizing the opening code of D1 on G1 to the opening code of D2 on G1.

In another development, the "birth" or "death" of a data record D1 using "timing" can be modeled by switching the opening code of D1 to access or non-access depending on a control signal which is initiated depending on a time measurement.

In another development, random changes of access to a data record D1 on a device G1 can be modeled by making the opening code of D1 on G1 dependent on a (dummy) random algorithm.

In another development, a combined selection can be made from the existing rules.

In another development, the opening codes are modeled by a parameter set; for example, integer, non-negative numbers, etc. Access to a data record (i.e., opening the presentation in response to a user input), is dependent on whether the opening code of the data record falls within a specified subset of parameters; for example, the quantity W. In this way, a population with multiple instances of data records can be modeled. Modeling of "birth", "death", "transfer" and "exchange" is shown in Tables 4a, 4b, 5 and 6.

In another development, the permitted opening codes are modeled by binary characters; e.g., 1=data access, 0=no data access.

In another the information about opening codes is also stored on a server. In this way, it is possible for a user of the server to act as the organizer of games and, for example, to obtain fees for participation from the users of the electronic communication devices.

In a further development of this, the opening code on electronic communication devices also can be influenced from the server. Further rules of play can be implemented in this way.

In another development, data communication between the electronic communication devices, especially the mobile communication devices, is based on one of the standards IrDA, HomeRF, IEEE 802.1 or Bluetooth, for example.

Preferably, the data records to be presented essentially contain pictures and/or soundtracks and/or video clips.

Although the present invention has been described with reference to specific embodiments, those of skill in the art will recognize that changes may be made thereto without departing from the spirit and scope of the present invention as set forth in the hereafter appended claims.

TABLE 1

Modeling of "access"

| Data record (represented by data record identifier) | Device | Opening code (Yes/No) |
|---|---|---|
| Access | | |
| D1 | G1 | Yes |
| Presentation of the data of the data record D1 on a device G1 after an initiating user input | | |
| No access: | | |
| D1 | G1 | No |
| Refusal of the presentation of the data of data record D1 on the device G1 after an initiating user input | | |

TABLE 2

Modeling of "transfer"

| Data record represented by data record identifier) | Device represented by device identifier) | Opening code (Yes/No) |
|---|---|---|
| Status beforehand | | |
| D1 | G1 | Yes |
| D1 | G2 | No |
| Status afterwards | | |
| D1 | G1 | No |
| D1 | G2 | Yes |

TABLE 3

Modeling of "exchange"

| Data record represented by data record identifier) | Device represented by device identifier) | Opening code (Yes/No) |
|---|---|---|
| Status beforehand | | |
| D1 | G1 | Yes |
| D1 | G2 | No |
| D2 | G1 | No |
| D2 | G2 | Yes |
| Status afterwards | | |
| D1 | G1 | No |
| D1 | G2 | Yes |
| D2 | G1 | Yes |
| D2 | G2 | No |

TABLE 4a

Modeling of "birth"

| Data record represented by data record identifier) | Device represented by device identifier) | Opening code (integer, non-negative number |
|---|---|---|
| Status beforehand | | |
| D1 | G1 | N |
| Status afterwards | | |
| D1 | G1 | N + 1 |

TABLE 4b

Modeling of "death"

| Data record represented by data record identifier) | Device represented by device identifier) | Opening code (integer, non-negative number |
|---|---|---|
| Status beforehand | | |
| D1 | G1 | N (N > 0) |
| Status afterwards | | |
| D1 | G1 | N − 1 |

TABLE 5

Modeling of "transfer"

| Data record represented by data record identifier) | Device represented by device identifier) | Opening code (integer, non-negative number |
|---|---|---|
| Status beforehand | | |
| D1 | G1 | N (N > 0) |
| D1 | G2 | M |
| Status afterwards | | |
| D1 | G1 | N + 1 |
| D1 | G2 | M − 1 |

TABLE 6

Modeling of "exchange"

| Data record represented by data record identifier) | Device represented by device identifier) | Opening code (integer, non-negative number |
|---|---|---|
| Status beforehand | | |
| D1 | G1 | N1 (N1 > 0) |
| D1 | G2 | N2 |
| D2 | G1 | M1 |
| D2 | G2 | M2 (M2 > 0) |
| Status afterwards | | |
| D1 | G1 | N1 − 1 |
| D1 | G2 | N2 + 1 |
| D2 | G1 | M1 + 1 |
| D2 | G2 | M2 − 1 |

The invention claimed is:

1. A method for controlling opening of a presentation of electronic data on electronic communication devices, the method comprising:
storing a first electronic data record in a plurality of data records, wherein each data record is identified by a record identifier;
storing a first opening code in association with the first electronic data record, wherein an opening of the presentation of the first electronic data record on an electronic communication device be dependent on the first opening code;
changing a first setting of the first opening code relating to the presentation of a first electronic data record based on a second setting of a second opening code relating to a presentation of a second electronic data record; and
storing the first setting on the electronic communication device.

2. A method for controlling opening of a presentation of electronic data on electronic communication devices as claimed in claim 1, wherein the change of opening codes is subject to a selection of the a transfer rules which, after an initiating user input, effects change of opening code of an electronic data record identified by a first data record identifier on a first communication device and a converse change of an opening code of a first data record identified by a record identifier on a second communication device.

3. A method for controlling opening of a presentation of electronic data on electronic communication devices as claimed in claim 1, wherein the change of opening codes is subject to a selection of a mutation rule which, after an initiating user input, effects change of opening code of an electronic data record identified by a first data record identifier on a first communication device and a converse change of an opening code of a data record identified by a second record identifier.

4. A method for controlling opening of a presentation of electronic data on electronic communication devices as claimed in claim 1, wherein the change of opening codes is subject to a selection of a propagation rule which effects synchronization of an opening code of an electronic data record identified by a first data record identifier on a first communication device with the opening code of a data record identified by the first data record identifier on a second communication device.

5. A method for controlling opening of a presentation of electronic data on electronic communication devices as claimed in claim 1, wherein the change of opening codes is subject to a selection of a pinning-on rule which effects synchronization of an opening code of an electronic data record identified by a first data record identifier on a first communication device with the opening code of a data record identified by a second data record identifier.

6. A method for controlling opening of a presentation of electronic data on electronic communication devices as claimed in claim 1, wherein the change of opening codes is subject to a selection of timing rule which effects change of an opening code of an electronic data record identified by a first data record identifier on a first communication device depending on a control signal initiated depending on a time measurement.

7. A method for controlling opening of a presentation of electronic data on electronic communication devices as claimed in claim 1, wherein the change of opening codes is subject to a selection of a random control rule which effects change of an opening code of an electronic data record identified by a first data record identifier on a first communication device depending on a random algorithm.

8. A method for controlling opening of a presentation of electronic data on electronic communication devices as claimed in claim 1, wherein a permitted opening code may be represented by a set of parameters, with the opening of the presentation of an electronic data record on an electronic communication device depending on whether the opening code falls within a specified subset of parameters.

9. A method for controlling opening of a presentation of electronic data on electronic communication devices as claimed in claim 8, wherein the permitted opening code may be represented by binary characters 0 and 1, with the presentation of electronic data record on an electronic communication device is opened only when the opening code assumes a value of 1.

10. A method for controlling opening of a presentation of electronic data on electronic communication devices as claimed in claim 1, the method further comprising the step of storing on a server information about a status of opening codes on an electronic communication device.

11. A method for controlling opening of a presentation of electronic data on electronic communication devices as claimed in claim 10, wherein the opening of presentations of electronic data or the status of the opening codes on an electronic communication device may be influenced by the server.

12. A method for controlling opening of a presentation of electronic data on electronic communication devices as claimed in claim 1, wherein data communication between electronic communication devices is based on a standard which is one of IrDA, HomeRF, IEEE 802.11 and Bluetooth.

13. A method for controlling opening of a presentation of electronic data on electronic communication devices as claimed in claim 1, wherein the data records essentially contain at least one of pictures, sound tracks and video clips.

14. A method for controlling opening of a presentation of electronic data on electronic communication devices as claimed in claim 1, wherein the electronic communication devices are mobile electronic communication devices.

* * * * *